United States Patent [19]

Ueda et al.

[11] Patent Number: 4,619,698

[45] Date of Patent: Oct. 28, 1986

[54] CUBIC BORON NITRIDE-BASED VERY HIGH PRESSURE-SINTERED MATERIAL FOR CUTTING TOOLS

[75] Inventors: Fumihiro Ueda, Ohmiya; Kaoru Kawada, Urawa; Kazuo Yamamoto, Tokyo; Noriaki Miwa, Tokyo; Toshiki Ishimatsu, Tokyo, all of Japan

[73] Assignee: Mitsubishi Kinzoku Kabushiki Kaisha, Tokyo, Japan

[21] Appl. No.: 563,666

[22] Filed: Dec. 20, 1983

[30] Foreign Application Priority Data

Jun. 29, 1981 [JP] Japan ................................ 56-100980

[51] Int. Cl.$^4$ .............................................. B22F 3/14
[52] U.S. Cl. ........................................ 75/238; 75/244; 419/12; 419/14
[58] Field of Search ......................... 75/244, 233, 238; 501/96; 419/12, 14

[56] References Cited

U.S. PATENT DOCUMENTS

| | | | |
|---|---|---|---|
| 4,334,928 | 6/1982 | Hara et al. | 75/244 |
| 4,343,651 | 8/1982 | Yazu et al. | 75/238 |
| 4,394,170 | 7/1983 | Sawaoka et al. | 75/244 |

Primary Examiner—Richard D. Lovering
Assistant Examiner—Anne Brookes
Attorney, Agent, or Firm—Frishauf, Holtz, Goodman & Woodward

[57] ABSTRACT

A cubic boron nitride-based very high pressure-sintered material very excellent in both toughness and wear resistance and adapted to be employed in cutting tools for milling hard steels and like machining purposes. The very high pressure-sintered material consists essentially of: 1–20 percent at least one compound selected from the group consisting of titanium carbide and titanium carbo-nitride; 1–20 percent at least one compound selected from the group consisting of CoAl, NiAl, and (Co, Ni)Al; and 75–97 percent cubic boron nitride and inevitable impurities. The very high pressure-sintered material may further contain 1–10 percent at least one metal selected from the group consisting of cobalt and nickel.

18 Claims, No Drawings

CUBIC BORON NITRIDE-BASED VERY HIGH PRESSURE-SINTERED MATERIAL FOR CUTTING TOOLS

BACKGROUND OF THE INVENTION

This invention relates to a cubic boron nitride-based very high pressure-sintered material having very excellent toughness and wear resistance, and more particularly to a cubic boron nitride-based very high-pressure-sintered material adapted for use in cutting tools for milling hard steels such as die steels and high-speed steels, and for like machining purposes.

Most hard steels such as die steels and high-speed steels generally have increased degrees of hardness exceeding 50 in terms of Rockwell hardness (C scale) after they have been subjected to heat treatment, and are accordingly very difficult to machine successfully. Therefore, in lieu of machining, such hard steels are ground mainly by the use of grinding wheels employing cubic boron nitrides (hereinafter abbreviated as "CBN" unless otherwise specified) as main ingredients.

However, in recent years, in order to comply with increasing demands for shortening the working time, attemps have been made to supersede grinding of hard steels of the above-mentioned kinds by machining in some technical fields. To this end, it has been proposed to employ CBN-based very high pressure-sintered materials in cutting tools for machining such hard steels. However, none of the CBN-based very high pressure-sintered materials conventionally employed in such cutting tools satisfy both high toughness and high wear resistance required for machining the hard steels. For instance, those sintered materials which are satisfactory only in wear resistance can easily be chipped, whereas those sintered materials which are satisfactory only in toughness can be worn out after a short period of use. This is why those conventional CBN-based very high pressure-sintered materials find very limited uses wherein small loads are applied on the cutting edges of the cutting tools, such as finish machining by the use of a lathe. Under such existing circumstances, one would never imagine the use of CBN-based very high pressure-sintered materials in cutting tools for milling the aforementioned hard steels, because milling generally requires severe machining conditions wherein the cutting edges of the cutting tools are susceptible to far larger loads as well as far larger thermal impacts and mechanical impacts than machining by means of a lathe.

OBJECT AND SUMMARY OF THE INVENTION

It is the object of the invention to provide a CBN-based very high pressure-sintered material which possesses excellent toughness as well as excellent wear resistance such that it can exhibit excellent cutting ability when used in cutting tools for milling hard steels or for other machining purposes.

The present invention provides a cubic boron nitride-based very high pressure-sintered material for use in cutting tools, which has the following composition (percent by weight):

(1) at least one compound selected from the group consisting of titanium carbide and titanium carbo-nitride, from 1 to 20;
(2) at least one body-centered cubic intermetallic compound selected from the group consisting of CoAl, NiAl, and (Co, Ni)Al, from 1 to 20; and
(3) cubic boron nitride and inevitable impurities, from 75 to 97.

The cubic boron nitride-based very high pressure-sintered material according to the invention may further contain at least one metal selected from the group consisting of cobalt and nickel, from 1 to 10 percent by weight.

DETAILED DESCRIPTION

Under the aforementioned circumstances, the present applicants have made many studies in order to obtain cubic boron nitride-based very high pressure-sintered materials which are markedly excellent in both toughness and wear resistance and are accordingly adapted for use in cutting tools for milling hard steels, which are required to satisfy the above properties. As a result, the applicants have reached the following findings:

A CBN-based very high pressure-sintered material which consists essentially of from 1 to 20 percent of at least one compound selected from the group consisting of titanium carbide (hereinafter referred to as "TiC") and titanium carbo-nitride (hereinafter referred to as "TiCN"), and from 1 to 20 percent of at least one body-centered cubic intermetallic compound selected from the group consisting of CoAl, NiAl, and (Co, Ni)Al, and if required, further contains from 1 to 10 percent of at least one selected from the group consisting of cobalt and nickel, and the balance (but limited within a range from 75 to 97 percent) of CBN and inevitable impurities are so markedly excellent in both toughness and wear resistance that it can exhibit excellent cutting ability when employed in cutting tools for a wide variety of kinds of machining including not only milling of hard steels but also for turning or peripheral cutting, boring, rough turning with a large depth of cut, flute cutting, and discontinuous or intermittent cutting.

The present invention is based upon the above findings.

The cubic boron nitride-based very high pressure-sintered materials according to the invention have the aforestated chemical compositions. Throughout the present specification percentages of the component elements are weight percentages.

The contents of the component elements of the cubic boron nitride-based very high pressure-sintered materials of the present invention are limited as previously mentioned for the following reasons:

(a) TiC and TiCN:

TiC and/or TiCN is contained in the very high pressure-sintered materials of the invention in an amount from 1 to 20 percent in total. These ingredients act to enhance the wear resistance and heat resistance of the sintered materials. Further, when used in a cutting tool, they both exhibit a common function of reducing the amount of crater formed in the face of the cutting tool. However, if the total content of TiC and TiCN is below 1 percent, the above actions cannot be performed to a required extent. On the other hand, if they are contained in excess of 20 percent, the sintered material will be brittle. For instance, a cutter containing such a high percentage of TiC and/or TiCN can be easily chipped when it is used in finishing with a small depth of cut a die steel having a degree of hardness of 60 in terms of Rockwell hardness (C scale). Therefore, the total content of TiC and/or TiCN has been limited to a range from 1 to 20 percent. Best results can be obtained if the total content of TiC and/or TiCN falls within a range from 7 to 17 percent. Preferably, the atomic ratio of carbon to nitrogen of the TiCN should be larger than 0.3 to 0.7. This is because if the atomic ratio is less than 0.3 to 0.7, the amount of nitrogen is excessive for the amount of carbon in the intermetallic compound, which degrades the sinterability or degree of sintering of the green compact such that the resulting sintered material can contain numerous residual microbores and can be degraded in both hardness and toughness. As a result, if the sintered material is used in a cutting tool, the cutting tool can have deteriorated resistance against flank wear and chipping.

(b) Body-Centered Cubic Intermetallic Compound(s):

At least one body-centered cubic intermetallic compound selected from the group consisting of CoAl, NiAl, and (Co, Ni)Al is contained in the very high pressure-sintered materials of the invention in an amount from 1 to 20 percent in total. Body-centered cubic intermetallic compounds such as CoAl, NiAl, and (Co, Ni)Al act to enhance the degree of sintering of the green compact and wear resistance of the sintered material, and when the sintered material is used in a cutting tool, they act to reduce the amount of flank wear of the cutting tool. However, if the total content of CoAl, NiAl, and/or (Co, Ni)Al is less than 1 percent, the sintered material cannot perform the above action satisfactorily and can also show degraded resistance against chipping. On the other hand, if the total content exceeds 20 percent, a crater can easily be formed in the face of the cutting tool, increasing the possibility of chipping of the cutting edge of the cutting tool. Therefore, the total content of CoAl, NiAl, and/or (Co, Ni)Al has been limited to a range from 1 to 20 percent. Particularly, within a range from 3 to 7 percent, the above actions can provide best results.

(c) CBN:

CBN is contained in the very high pressure-sintered materials of the invention in an amount from 75 to 97 percent. CBN is indispensable for imparting very excellent properties of wear resistance and chipping resistance to the very high pressure-sintered materials. If the CBN content is less than 75 percent, required wear resistance and required chipping resistance cannot be obtained, whereas if it exceeds 97 percent, it will greatly deteriorate the degree of sintering of the green compact, causing easy falling-off of grains of the CBN and eventually causing a marked deterioration in the wear resistance of the resulting sintered material. For these reasons, the CBN content has been limited to a range from 75 to 97 percent. Particularly, if the CBN content is within a range from 79 to 90 percent, best properties of wear resistance and chipping resistance can be obtained.

(d) Co and Ni:

The very high pressure-sintered materials of the invention may further contain at least one metal selected from the group consisting of cobalt and nickel in an amount from 1 to 10 percent in total. Cobalt and nickel both act to improve the degree of sintering of the green compact in the manufacture of the sintered material, and therefore should preferably be added if a specially high degree of sintering is required of the green compact. If the total content of cobalt and/or nickel is less than 1 percent, required improvement of the degree of sintering cannot be expected, whereas in excess of 10 percent, there will occur degradation of the hardness of the resulting sintered material, resulting in increased crater and flank wear of a cutting tool containing such ingredient(s). Therefore, the total content has been limited to a range from 1 to 10 percent. Particularly, within a content range from 2 to 5 percent, cobalt and/or nickel can provide best results of improvement of the degree of sintering.

In the manufacture of a very high pressure-sintered material according to the invention, first, powder of CBN, powder of CoAl, powder of NiAl, powder of (Co, Ni)Al, powder of TiC, and powder of TiCN, and if required, powder of Co and powder of Ni are prepared as starting powders. Powder of CoAl, powder of NiAl, and powder of (Co, Ni)Al should be used. If powder of Co, powder of Ni, or powder of Al, is used in place of the former powders, such powder is apt to be segregated or unevenly distributed in the sintered material, deteriorating the wear resistance and chipping resistance of the sintered material.

The above-mentioned starting powders are blended into a mixture having a predetermined composition with a predetermined blending ratio, of which percentages of the individual components fall within the range of the present invention. The mixture was kneaded in a ball mill, and then compacted or pressed under a pressure of about 2 tons/cm$^2$ into a green compact. The green compact thus obtained is charged into a very high pressure cell, singly or superimposed on a green compact of a sintered hard alloy or a cermet having high toughness and high rigidity, or a sintered compact of same. In the very high pressure cell, the green compact of the powders singly or together with the latter green compact or sintered compact is subjected to very high pressure sintering under a pressure of 40–70 tons/cm$^2$, at a temperature of 1200°–1500° C., and for a retention time of 10–60 minutes.

EXAMPLE

Examples of the very high pressure-sintered material of the invention will now be described in comparison with comparative examples. The following starting powders were prepared: powder of CBN with a mean grain size of 3 $\mu$m, powder of TiC$_{0.7}$N$_{0.3}$ with a mean grain size of 1 $\mu$m, powder of TiC with a mean grain size of 1 $\mu$m, powder of CoAl with a mean grain size of 0.7 $\mu$m, powder of NiAl with a mean grain size of 0.7 $\mu$m, powder of (Co, Ni)Al with a mean grain size of 0.7 $\mu$m, powder of Ni with a mean grain size of 1 $\mu$m, and powder of Co with a mean grain size of 1 $\mu$m. These starting powders were blended into mixtures having respective compositions shown in the table. Each of these mixtures was kneaded in a ball mill and pressed under a pressure of 2 tons/cm$^2$ into a plate-like green compact having a size of 10 mm in diameter and 0.7 mm in thickness. Each of the green compacts thus obtained was charged into a very high pressure cell in a state superimposed on a green compact of a mixture of powder of Co and powder of WC having a composition of Co: 12 percent and WC: the balance, having the same size as the green compact of the starting powders. The green compacts thus charged were subjected to very high pressue sintering under a pessure of 50 tons/cm$^2$, at a temperture of 1300° C.,

TABLE

| Specimen | TiC | TiC$_{0.7}$N$_{0.3}$ | NiAl | CoAl | (Ni, Co)Al | Ni | Co | CBN | MILLING TIME BEFORE FLANK WEAR OF 0.3 mm (minute) | TURNING TIME BEFORE FLANK WEAR OF 0.2 mm (minute) |
|---|---|---|---|---|---|---|---|---|---|---|
| VERY HIGH PRESSURE-SINTERED MATERIALS ACCORDING TO THE PRESENT INVENTION | | | | | | | | | | |
| 1 | 1 | — | 2 | — | — | — | — | 97 | 15 | 30 |
| 2 | 13 | — | 7 | — | — | — | — | 80 | 25 | 45 |
| 3 | 13 | — | 5 | — | — | — | — | 82 | 30 | 45 |
| 4 | 13 | — | 3 | — | — | — | — | 84 | 20 | 40 |
| 5 | 7 | — | 5 | — | — | — | — | 88 | 20 | 35 |
| 6 | 17 | — | 5 | — | — | — | — | 78 | 25 | 40 |
| 7 | 20 | — | 2 | — | — | — | — | 78 | 10 | 20 |
| 8 | — | 1 | 2 | — | — | — | — | 97 | 15 | 30 |
| 9 | — | 20 | 2 | — | — | — | — | 78 | 10 | 20 |
| 10 | 7 | 7 | 7 | — | — | — | — | 79 | 25 | 45 |
| 11 | 7 | 7 | 5 | — | — | — | — | 81 | 25 | 50 |
| 12 | — | 13 | 1 | — | — | — | — | 86 | 16 | 30 |
| 13 | — | 13 | 3 | — | — | — | — | 84 | 20 | 40 |
| 14 | — | 13 | 5 | — | — | — | — | 82 | 25 | 45 |
| 15 | — | 13 | 7 | — | — | — | — | 80 | 22 | 45 |
| 16 | — | 13 | 10 | — | — | — | — | 77 | 22 | 45 |
| 17 | — | 3 | 20 | — | — | — | — | 77 | 16 | 35 |
| 18 | — | 13 | — | 1 | — | — | — | 86 | 18 | 35 |
| 19 | — | 13 | — | 3 | — | — | — | 84 | 20 | 40 |
| 20 | — | 13 | — | 5 | — | — | — | 82 | 27 | 50 |
| 21 | — | 13 | — | 7 | — | — | — | 80 | 25 | 45 |
| 22 | — | 13 | — | 10 | — | — | — | 77 | 20 | 45 |
| 23 | — | 3 | — | 20 | — | — | — | 77 | 15 | 30 |
| 24 | — | 13 | — | — | 1 | — | — | 86 | 18 | 35 |
| 25 | — | 13 | — | — | 3 | — | — | 84 | 22 | 40 |
| 26 | — | 13 | — | — | 5 | — | — | 82 | 25 | 50 |
| 27 | — | 13 | — | — | 7 | — | — | 80 | 25 | 45 |
| 28 | — | 13 | — | — | 10 | — | — | 77 | 22 | 45 |
| 29 | — | 3 | — | — | 20 | — | — | 77 | 12 | 30 |
| 30 | — | 5 | 5 | 5 | — | — | — | 85 | 12 | 25 |
| 31 | — | 5 | 4 | 4 | 4 | — | — | 83 | 10 | 25 |
| 32 | — | 13 | 12 | — | — | — | — | 75 | 15 | 30 |
| 33 | — | 1.5 | 1.5 | — | — | — | — | 97 | 15 | 30 |
| 34 | — | 5 | 5 | — | — | 1 | — | 89 | 15 | 30 |
| 35 | — | 5 | 5 | — | — | 5 | — | 85 | 12 | 35 |
| 36 | — | 5 | 5 | — | — | 10 | — | 80 | 10 | 20 |
| 37 | — | 13 | 4 | — | — | 1 | — | 82 | 25 | 45 |
| 38 | — | 13 | 4 | — | — | 2 | — | 81 | 27 | 45 |
| 39 | — | 13 | 4 | — | — | 3 | — | 80 | 32 | 45 |
| 40 | — | 13 | 4 | — | — | 4 | — | 79 | 30 | 45 |
| 41 | — | 13 | 4 | — | — | 6 | — | 77 | 25 | 40 |
| 42 | — | 5 | 5 | — | — | — | 1 | 89 | 15 | 30 |
| 43 | — | 5 | 5 | — | — | — | 10 | 80 | 10 | 20 |
| 44 | — | 13 | 4 | — | — | — | 3 | 80 | 30 | 45 |
| 45 | — | 5 | 5 | — | — | 5 | 5 | 80 | 10 | 20 |
| 46 | — | 13 | 4 | — | — | 1.5 | 1.5 | 80 | 30 | 45 |
| COMPARATIVE VERY HIGH PRESSURE-SINTERED MATERIALS | | | | | | | | | | |
| 47 | —* | —* | 10 | — | — | — | — | 90 | 4 | 5 |
| 48 | 27* | — | 2 | — | — | — | — | 76 | <1 | <1 |
| 49 | — | 22* | 2 | — | — | — | — | 76 | <1 | <1 |
| 50 | — | 13 | —* | —* | —* | — | — | 87 | <1 | <1 |
| 51 | — | 2 | 22* | — | — | — | — | 76 | 4 | 8 |
| 52 | — | 2 | — | 22* | — | — | — | 76 | 3 | 8 | and for a retention time of 15 minutes, to obtain very high pressure-sintered materials Nos. 1–46 according to the present invention and comparative very high pressure-sintered materials Nos. 47–52, each of which has a substantially identical composition with its blended composition before sintering. The comparative very high pressure-sintered materials Nos. 47–52 each have at least one of its components contained in an amount falling outside the range of the present invention, whose content value is asterisked in the table. All percentages in the specification are by weight.

Next, the very high pressure-sintered materials Nos. 1–46 according to the present invention and the comparative very high pressure-sintered materials Nos. 47–52 obtained as above were each cut into the form of a cutter tip, and the cutter tip was brazed to a holder made of a sintered hard alloy and subjected to finish grinding. Then, the finished cutter tips were subjected to a hard steel-milling test and a hard steel-turning test, under the following conditions:

Hard Steel-Milling Test
Milling Steel: Die Steel SKD-11 according to G 4401 of Japanese Industrial

| | |
|---|---|
| | Standard (JIS), with a hardness degree of 53 (HRC); |
| Cutter Diameter: | 160 mm; |
| Tip Configuration: | SNP 432; |
| Cutting Speed: | 200 m per minute; |
| Depth of Cut: | 0.5 mm; |
| Feed per Cutting Edge: | 0.2 mm; |
| Width of Cut: | 100 mm |
| Hard Steel-Turning Test | |
| Turning Steel: | Die Steel SKD-11 according to G 4401 of JIS, with a hardness degree of 60 (HRC); |
| Depth of Cut: | 0.5 mm; |
| Feed per Revolution: | 0.1 mm; |
| Cutting Speed: | 60 m per minute; |
| Cutting Oil: | Not used. |

In the hard steel-milling test, the time before the flank wear becomes 0.3 mm was measured, while in the hard steel-turning test, the time before the flank wear becomes 0.2 mm was measured. The results of measurements are also shown in the table.

It will be learned from the table that the very high pressure-sintered materials Nos. 1–46 according to the present invention impart very long lives to the cutting tools, while the comparative very high pressure-sintered materials Nos. 47–52, of which one or more components have contents falling outside the range of the present invention, impart shorter lives to the cutting tools.

As stated above, CBN-based very high pressure-sintered materials according to the present invention possess very excellent properties of toughness and wear resistance at the same time, and can therefore exhibit very excellent and satisfactory performance not only when they are used in cutting tools for milling hard steels but also as cutting tools for machining hard steels by the use of lathes, ones for machining structural hardened steels, as well as ones for machining nickel-based super alloys and cobalt-based super alloys.

What is claimed is:

1. A cubic boron nitride-based very high pressure-sintered material for use in cutting tools, consisting essentially of from 1 to 20 percent by weight of at least one compound selected from the group consisting of titanium carbide and titanium carbo-nitride, from 1 to 20 percent by weight of at least one body-centered cubic intermetallic compound selected from the group consisting of CoAl, NiAl, and (Co, Ni)Al; and from 75 to 97 percent by weight of cubic boron nitride and inevitable impurities.

2. The cubic boron nitride-based very high pressure-sintered material as claimed in claim 1, further including from 1 to 10 percent by weight of at least one metal selected from the group consisting of cobalt and nickel.

3. The cubic boron nitride-based very high pressure-sintered material as claimed in claim 2, wherein said at least one metal selected from the group consisting of cobalt and nickel is in an amount from 2 to 5 percent by weight.

4. The cubic boron nitride-based very high pressure-sintered material as claimed in claim 1, wherein said at least one compound selected from the group consisting of titanium carbide and titanium carbo-nitride is in an amount from 7 to 17 percent by weight.

5. The cubic boron nitride-based very high pressure-sintered material as claimed in claim 1, wherein said at least one body-centered cubic intermetallic compound selected from the group consisting of CoAl, NiAl, and (Co, Ni)Al is in an amount from 3 to 7 percent by weight.

6. The cubic boron nitride-based very high pressure-sintered material as claimed in claim 1, wherein said cubic boron nitride and inevitable impurities are in an amount from 79 to 90 percent by weight.

7. The cubic boron nitride-based very high pressure-sintered material as claimed in claim 1, wherein said titanium carbonitride has an atomic ratio of carbon to nitrogen of at least 0.3 to 0.7.

8. The cubic boron nitride-based very high pressure-sintered material as claimed in claim 1, wherein said at least one compound selected from the group consisting of titanium carbide and titanium carbo-nitride is in an amount from 7 to 17 percent by weight; said at least one body-centered cubic intermetallic compound selected from the group consisting of CoAl, NiAl, and (Co, Ni)Al is in an amount from 3 to 7 percent by weight; and said cubic boron nitride and inevitable impurities are in an amount from 79 to 90 percent by weight.

9. The cubic boron nitride-based very high pressure-sintered material as claimed in claim 8, further including from 1 to 10 percent by weight of at least one metal selected from the group consisting of cobalt and nickel.

10. The cubic boron nitride-based very high pressure-sintered material as claimed in claim 9, wherein said at least one metal selected from the group consisting of cobalt and nickel is in an amount from 2 to 5 percent by weight.

11. The cubic boron nitride-based very high pressure-sintered material as claimed in claim 10, wherein said titanium carbo-nitride has an atomic ratio of carbon to nitrogen of at least 0.3:0.7.

12. The cubic boron nitride-based very high pressure-sintered material as claimed in claim 8, wherein said titanium carbo-nitride has an atomic ratio of carbon to nitrogen of at least 0.3:0.7.

13. A method of manufacturing a tough cubic boron nitride-based very high pressure-sintered material for use in cutting tools, comprising:
   admixing the following powders:
   (1) powder of at least one compound selected from the group consisting of titanium carbide and titanium carbo-nitride;
   (2) powder of at least one intermetallic compound selected from the group consisting of CoAl, NiAl, and (CO, Ni)Al; and
   (3) powder of cubic boron nitride and inevitable impurities; to form a homogeneous mixture having a predetermined blended composition of from 1 to 20 percent by weight of said powder (1), from 1 to 20 percent by weight of said powder (2), and from 75 to 97 percent by weight of said powder (3);
   pressing said mixture into a green compact; and
   sintering said green compact to form a tough cubic boron nitride.

14. The method of claim 13, wherein a cobalt or nickel powder in an amount of from 1 to 10% by weight is admixed with said powders (1), (2) and (3).

15. The method of claim 14, wherein said titanium carbonitride has an atomic ratio of carbon to nitrogen of at least 0.3:0.7.

16. The method of claim 15, wherein said powder (1) is in an amount of from 7 to 17% by weight; said powder (2) is in an amount from 3 to 7% by weight; said powder (3) is in an amount from 79 to 90% by weight;

and said cobalt or nickel is in an amount from 2 to 5% by weight.

17. The method of claim 13, wherein said titanium carbonitride has an atomic ratio of carbon to nitrogen of at least 0.3:0.7.

18. The method of claim 13, wherein said powder (1) is in an amount of from 7 to 17% by weight; said powder (2) is in an amount from 3 to 7% by weight; and said powder (3) is in an amount from 79 to 90% by weight.

* * * * *